United States Patent [19]

Kowalski

[11] 4,239,643

[45] Dec. 16, 1980

[54] PEROXIDE STABILIZATION

[75] Inventor: Xavier Kowalski, St. Louis, Mo.

[73] Assignee: Monsanto Company, St. Louis, Mo.

[21] Appl. No.: 403

[22] Filed: Jan. 2, 1979

[51] Int. Cl.$^3$ .................. C11D 3/06; C11D 3/395; C11D 7/56
[52] U.S. Cl. .................. 252/182; 8/111; 162/78; 162/80; 252/99; 252/174.16; 252/181; 252/186; 252/526; 260/502.5
[58] Field of Search .............. 252/186, 99, 181, 526, 252/174.16, 182; 260/502.5; 8/111; 162/80, 78; 210/58

[56] References Cited

U.S. PATENT DOCUMENTS

| | | | |
|---|---|---|---|
| 3,351,558 | 11/1967 | Zimmerer | 252/389 A |
| 3,387,939 | 6/1967 | Reilly et al. | 252/186 |
| 3,451,939 | 6/1969 | Ralston | 252/181 |
| 3,687,627 | 8/1972 | Stalter | 252/186 |
| 3,701,825 | 10/1972 | Radimor et al. | 260/502.5 |
| 3,751,372 | 8/1973 | Zecher | 252/389 A |
| 3,833,517 | 9/1974 | Kling et al. | 252/545 |
| 3,860,391 | 1/1975 | Kling et al. | 252/186 |
| 3,890,165 | 6/1975 | Liso | 252/389 A |
| 3,954,401 | 5/1976 | Kling et al. | 252/545 |
| 3,992,318 | 11/1976 | Gaupp et al. | 252/389 A |

OTHER PUBLICATIONS

"Hydrogen Peroxide Bleaching with Dequest Phosphonates", Monsanto, Aug., 1978.

*Primary Examiner*—Benjamin R. Padgett
*Assistant Examiner*—Irwin Gluck
*Attorney, Agent, or Firm*—George R. Beck

[57] ABSTRACT

In aqueous peroxide-containing solutions used in bleaching of cellulose fiber, peroxide stability is very greatly increased by inclusion of alkali metal polyphosphate and alkali metal diethylene triamine penta(methylene phosphonate). Especially useful for addition of such stabilizers to the peroxide-containing solutions to increase such stability are essentially anhydrous compositions containing metal sequestering compounds comprising such polyphosphate and phosphonate in a weight ratio from about 10:1 to about 1:5.

5 Claims, No Drawings

PEROXIDE STABILIZATION

BACKGROUND OF THE INVENTION

The problem of stabilizing peroxide compounds (e.g. hydrogen peroxide) in aqueous solutions employed in bleaching of cellulose fiber is well known in the art. Various expedients, including use of diethylene triamine penta(methylene phosphonic acid) and its water soluble salts have been proposed, e.g. in U.S. Pat. No. 3,860,391 issued Jan. 14, 1975 to A. Kling et al., the disclosure of which is incorporated herein by reference. Such expedients have provided substantial improvements in peroxide stabilization but it is desirable to further increase such stability, e.g. to lower the amount of peroxide consumed in bleaching a given amount of cellulose fiber, to facilitate holding constant the conditions under which the bleaching is carried out, etc.

Accordingly, it is an object of this invention to provide an improvement of such a process whereby stability of peroxide in the bleaching solution is substantially increased. Another object is improvement of peroxide stability in bleaching solutions essentially free of the silicates which are commonly used to enhance such stability but tend to cause or aggravate other problems in the bleaching operation such as precipitates that result in fabric abrasion, uneven dyeing and finishing, etc. Another object is improved peroxide stability in the hard waters from which such solutions are typically prepared for commercial-scale bleaching. Still another object is provision of a storage-stable composition which may be conveniently added to such solutions to enhance peroxide stability therein. These and other objects will be further apparent from the following disclosure in which percentages are by weight except where otherwise noted.

SUMMARY OF THE INVENTION

In accordance with this invention, the foregoing objects are achieved to an unexpectedly great degree by an improvement in processes for bleaching cellulose fiber with an aqueous peroxide-containing solution, the improvement comprising including in said solution the combination of small amounts of (a) alkali metal polyphosphate and (b) alkali metal diethylene triamine penta(methylene phosphonate). Of particular utility in practice of the invention is a storage-stable, essentially anhydrous composition containing metal sequestering compounds comprising such polyphosphate and phosphonate in a weight ratio of polyphosphate to phosphonate from about 10:1 to about 1:5.

DETAILED DESCRIPTION OF THE INVENTION

As used herein, the term "cellulose fiber" has reference to wood, cotton, linen, jute and other fibers of a cellulosic nature, and also includes individual fibers (e.g. wood pulp or cotton fiber) as well as yarns, tows, webs, fabric (woven or non-woven) and other aggregates of such fibers.

The invention is based on the unexpected discovery that in aqueous solutions of the kind and under conditions conventionally employed in bleaching of cellulose fiber, peroxide stability is greatly increased by use of a combination of alkali metal polyphosphate and alkali metal diethylene triamine penta(methylene phosphonate). Moreover, such increase is substantially greater than that which would be expected from the increases in peroxide stability that result from separate use of equivalent amounts of such polyphosphate and phosphonate.

Although the process improvement utilizing that discovery is especially advantageously used in bleaching solutions which are essentially free of the silicates commonly used in peroxide stabilization, e.g. sodium silicates, it may also be utilized with bleaching solutions containing silicates in amounts sufficient to substantially increase peroxide stability. In addition, the bleaching solutions may contain other conventional substituents such as, e.g. surfactants, high boiling solvents for removal of oils, etc.

Also as used herein, the term "solution" should be recognized as open to the presence of small amounts of other dissolved or undissolved constituents. In fact, the invention has particular utility for peroxide stabilization in solutions prepared from hard (mineral-containing) waters of the kind typically used in commercial preparation of bleaching solutions. Thus, especially good results are achieved by the present invention in solutions of substantial hardness, i.e. solutions containing at least about 20 ppm and even up to 40 ppm or more of alkaline earth metal ions (normally Ca and/or Mg).

The polyphosphates employed in this invention are those having the formula

$$M_{n+2}P_nO_{3n+1}$$

wherein M is alkali metal or other cation functionally equivalent for use in this inventiion, preferably sodium and/or potassium, and n is an integer of at least 2, preferably from 2 to about 24. There are many such polyphosphates known in the art including, e.g. sodium pyrophosphate, potassium pyrophosphate, sodium tetrapolyphosphate, potassium hexametaphosphate, sodium hexametaphosphate, potassium tripolyphosphate and generally most preferred for use in this invention, sodium tripolyphosphate. Such polyphosphates include complete and partial salts, as well as those having mixed cations, e.g. a sodium potassium tripolyphosphate. Mixtures of polyphosphates may also be used.

The phosphonates used in this invention are the alkali metal (or functionally equivalent) salts of diethylene triamine penta(methylene phosphonic acid). Such phosphonates may be complete or partial salts and are preferably those of sodium and/or potassium, e.g. tripotassium diethylyene triamine penta(methylene phosphonate), tetrasodium diethylene triamine penta(methylene phosphonate), etc. Mixtures of such phosphonates may also be employed if desired.

The optimum concentrations of polyphosphate and phosphonate in the peroxide-containing solutions stabilized in accordance with this invention vary depending on the peroxy compound concentration, the specific peroxy compound employed, pH, temperature, etc. However, such solutions contain typically from about 0.1 to about 10 grams per liter (g/l) and, usually even more desirably, from about 0.5 to about 5 g/l of the aforementioned phosphonate. In combination therewith, such solutions also contain typically from about 0.2 to about 20 g/l and, generally even more desirably, from about 1 to about 10 g/l of the aforementioned polyphosphate. Best results are normally obtained using bleaching solutions containing such polyphosphate and phosphonate in a weight ratio of polyphosphate to phosphonate from about 10:1 to about 1:5 (preferably from about 5:1 to about 1:2).

Thus compositions comprising such polyphosphate and phosphonate in weight ratios within those ranges are of particular utility for addition to peroxide-containing solutions employed in accordance with the process improvements of this invention. To inhibit hydrolysis of the polyphosphate, it is further preferred that such a composition be essentially anhydrous, i.e. containing no water or a sufficiently small amount of water that the polyphosphate does not hydrolyze to an extent not compatible with use of the composition in accordance with the process improvement of this invention. Such polyphosphates and phosphonates are well known as metal sequestering compounds, i.e. compounds having the ability to sequester multivalent metals (e.g. $Fe^{++}$, $Cu^{++}$, alkaline earth metals such as Ca, Mg, etc.) when present in sufficient amount in aqueous solutions containing ions of such metals and, in certain preferred embodiments of this invention, the metal sequestering compounds present in the aforementioned essentially anhydrous compositions are compounds consisting essentially of the aforementioned polyphosphate and phosphonate.

As aforesaid, the conditions under which the peroxide-containing solutions are used in bleaching of cellulose fiber are well known in the art. Normally such solutions have a pH from about 7 to about 12.5 and even more typically from about 9 to about 11.5. The bleaching process is usually carried out for a period of time between about 10 seconds and about one hour or longer at a temperature generally between about 20° and about 150° C., most commonly at least about 50° C. and, in bleaching of cellulose textile fiber, typically at least about 90° C. The bleaching solution contains hydrogen peroxide in an effective cellulose fiber-bleaching concentration, usually from about 0.5% to about 35%, or even higher if desired. In place of hydrogen peroxide there can be used other bleaching agents capable of splitting off oxygen in a manner similar to that of hydrogen peroxide. The solution may contain some caustic but preferably not more than about 2%, as distinguished from the higher concentrations normally used in commercial scouring of cellulose fiber material, e.g. fabric.

The following specific examples are for purposes of illustration only and do not imply any limitations on the scope of the invention.

EXAMPLES

By proposed AATCC Test Method RA-90, various polyphosphonates, a diethylene triamine penta(methylene phosphonate) and combinations thereof were compared for their effect on stability of hydrogen peroxide in aqueous solutions under conditions simulating use in bleaching of cotton fabric, wood pulp or other cullulose fiber. In accordance with that procedure, peroxide concentrations in such solutions were periodically measured by AATCC Test Method 102-1975 over a period of 90 minutes immediately following heating of the solutions from ambient temperature to 93.3° C. The solutions had been prepared by adding 20 g/l of a commercial-grade 35% solution of $H_2O_2$ in water and 2.5 g/l of 50% aqueous NaOH to silicate-free water containing 30 ppm Ca, 10 ppm Mg, 1 ppm $Fe^{++}$ and 0.25 ppm $Cu^{++}$ ions. The solutions had a pH of 10.5±0.02. Results are shown in the following table.

TABLE

Effect of Polyphosphates and Diethylene Triamine Penta(methylene phosphonate) on Peroxide Stability in Silicate-Free Hard Water

| g/l Polyphosphate→<br>g/l Na5 DTPMP[1]→ | —<br>2 | 4 STP[2]<br>— | 4 STP<br>2 | 4 TSPP[3]<br>— | 4 TSPP<br>2 | 4 SHMP[4]<br>— | 4 SHMP<br>2 |
|---|---|---|---|---|---|---|---|
| INITIAL | 2.05 | 1.81 | 2.02 | 1.87 | 2.04 | 1.79 | 2.02 |
| @93.3° C. | 1.97 | <0.01 | 1.93 | <0.01 | 1.92 | <0.01 | 1.92 |
| 15 minutes | 1.94 | — | 1.91 | — | 1.91 | — | 1.85 |
| 30 minutes | 1.81 | — | 1.83 | — | 1.85 | — | 1.80 |
| 45 minutes | 1.17 | — | 1.77 | — | 1.67 | — | 1.69 |
| 60 minutes | 0.40 | — | 1.63 | — | 1.43 | — | 1.63 |
| 75 minutes | 0.05 | — | 1.57 | — | 1.14 | — | 1.56 |
| 90 minutes | 0.01 | — | 1.48 | — | 0.76 | — | 1.51 |

[1] Pentasodium diethylene triamine penta(methylene phosphonate)
[2] Sodium tripolyphospate
[3] Tetrasodium pyrophosphate
[4] Sodium hexametaphosphate From the data in the foregoing table it will be apparent that in the bleaching solutions containing a diethylene triamine penta(methylene phosphonate) in combination with a polyphosphate as described hereinbefore, peroxide stability is much greater than in otherwise-similar solutions from which either the phosphonate or polyphosphate is omitted.

I claim:

1. An essentially anhydrous composition containing metal sequestering compounds comprising alkali metal polyphosphate and alkali metal diethylene triamine penta(methylene phosphonate) in a weight ratio of said polyphosphate to said phosphonate from about 10:1 to about 1:5.

2. Composition of claim 1 wherein said polyphosphate is predominantly sodium tripolyphosphate.

3. Composition of claim 1, said compounds consisting essentially of said polyphosphate and said phosphonate.

4. Composition of claim 3 wherein said ratio is from about 5:1 to about 1:2, said phosphonate consisting essentially of sodium or potassium diethylene triamine penta(methylene phosphonate).

5. Composition of claim 4 wherein said polyphosphate is essentially sodium tripolyphosphate.

* * * * *